2 Sheets. Plate 1.

FRED. VILLARD
Hay & Manure Fork.

No. 118,410. Patented Aug. 22, 1871.

WITNESSES. INVENTOR.

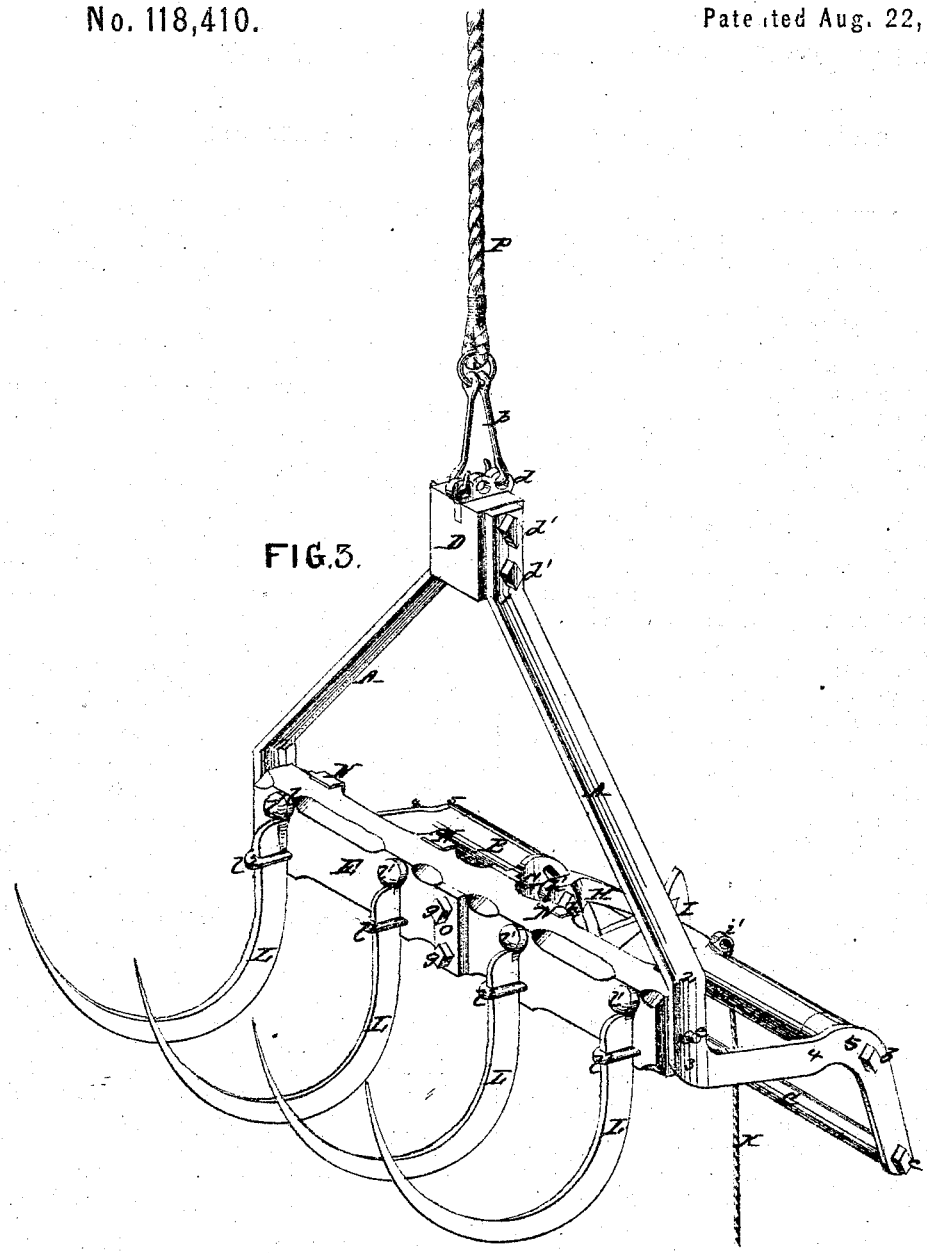

UNITED STATES PATENT OFFICE.

FRIEDRICH VILLARD, OF MOUNT EATON, OHIO.

IMPROVEMENT IN COMBINED HAY AND MANURE-FORKS.

Specification forming part of Letters Patent No. 118,410, dated August 22, 1871.

*To all whom it may concern:*

Be it known that I, FRIEDRICH VILLARD, of Mount Eaton, in the county of Wayne and State of Ohio, have invented an Improved Hay and Manure-Fork, of which the following is a specification:

My invention relates, primarily, to those combined hay and manure-forks which are adapted for their different uses by conversion, but is, in part, applicable to independent manure-forks. The first part of the invention consists in an adjustable rigid latch of peculiar construction for the tine-head, adapting the angle of the tines to be varied. The invention further consists in a removable runner or support applied in a peculiar manner to the tine-head to assist in unloading manure and to support the frame when the fork is unloaded.

Figure 1:
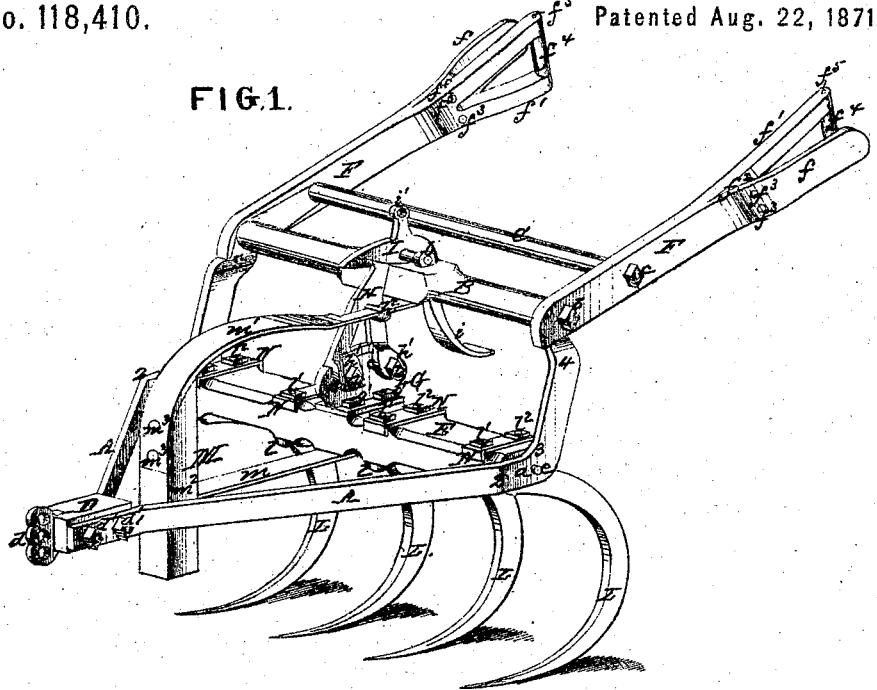
Figure 2:
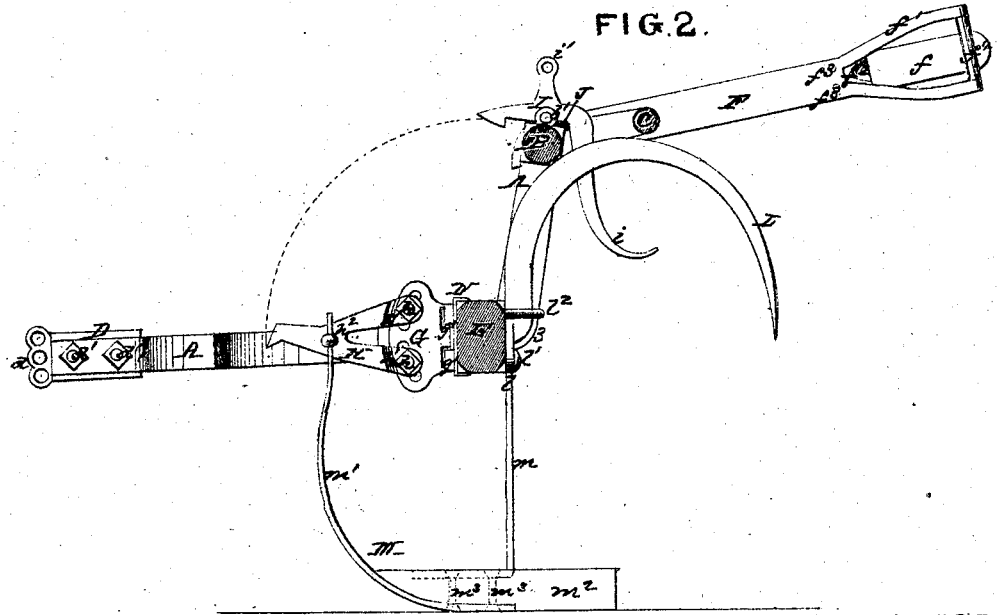

Figure 1 is a perspective view of my combined implement adapted for use as a manure-rake, the tines being in working position. Fig. 2 is a longitudinal section of the implement as used as a manure-rake with the tines elevated. Fig. 3 is a perspective view of the implement adjusted for use as a horse hay-fork, and in working position.

Similar letters of reference indicate like parts in the several figures.

The frame of my implement is composed of two longitudinal flat metal bars, A A, transverse bars B C supporting the rear ends of these at proper distance apart, and a narrow block, D, containing a clevis or pulley, $d$, for the attachment of draft. The longitudinal bars A A form angles 1 behind the clevis or pulley-block D, expanding more or less abruptly to a suitable width apart to receive the tine-head E, where, forming second angles, 2, they extend back a short distance parallel, still in the same plane; then, forming third angles 3, they project obliquely upward (supposing the frame to be horizontal, as in Fig. 1,) to a proper point for the attachment of the handles F F, employed for controlling the implement when it is used as a manure-rake, where, forming fourth and fifth angles, 4 5, they are bent inward so as to occupy recesses in the inner sides of the handles F, and backward in the line of the handles a sufficient distance to properly support the same. The transverse bars B C of the frame are of wood. They are arranged, respectively, at the fifth angle 5 of the longitudinal bars A and at the rear extremity of said bars; and the same screws, $b$ $c$, connect the said bars and attach the handles F. The clevis or pulley-block D is held between the front ends of the longitudinal bars A by transverse bolts $d'$. Perforations $a$ in the longitudinal bars A, between the second and third angles 3 4 of the same, receive pins $e$ in the ends of the tine-head E, which I make of wood, which is thus pivoted in the frame. The handles F I make with guards $f$ outside of their handles proper $f^1$, to protect the hands of the operator from abrasion and dirt, which they are otherwise subjected to in the use of the implement. Making the handles of wood, I form these guards by first splitting out thin strips to form the guards $f$, and supporting the same by wedges $f^2$, held by pins $f^3$, and furcating the remainder and applying transverse bars $f^4$, held by bolts or rivets $f^5$, to form the handles $f^1$. Attached to the upper side of the tine-head E, through the medium of a segmental-slotted bracket, G, bolts $h$, and perforated lugs $h^1$, is a latch, H, which, by reason of said attachment, is adjustable. A catch, I, pivoted in the eyes of a pair of staple-bolts, $b'$, on the top of the inner transverse bar B, depressed by a rubber cushion, J, applied in a recess under its rear end, and provided with a pedal-arm, $i$, and a perforated arm, $i'$, for the attachment of a trip-cord, K, as means for elevating it, engages with the latch H of the tine-head to hold the tines L in working position. The latch-supporting bracket G is attached to the tine-head E by central bolts $g$, being recessed to receive the nuts $g'$ of the same. The latch-bracket attaching-bolts $g$, and a staple-bolt, $h^2$, through the latch H, serve to attach a runner, M, for supporting the frame in the manure-raking use of the implement, said bolts engaging, respectively, with an upright, $m$, of the said runner, and the extremity of its front or nose $m^1$, which are attached to opposite sides of the sole $m^2$ by one set of through-rivets, $m^3$. The tines L are thin and deep in cross-section, tapering in depth to their points and terminating at their butts in flat perforated lugs $l$. They are attached to their head E by bolts $l^1$ passing through the said lugs and staple-bolts $l^2$, embracing the tines where they are deepest, lipped plates N being interposed under the nuts of said bolts. A very strong fastening for said tines, affording support against both direct and lateral strain, is thus afforded.

In converting the implement from a manure-rake or fork to a hay-fork, the handles F are removed and their attaching-bolts b c screwed in their full length, the runner M is removed and a washer, O, substituted for its upright m under the heads of the latch-bracket attaching-screws g, the latch G adjusted, and the trip-cord K and hoisting-rope P applied. The latter may be attached by a suitable clutch, p, to the clevis d of a clevis-block, D, as shown, or a pulley-block of similar size, and correspondingly perforated, be substituted therefor.

In the description of the frame of the implement the term "angle" is used to designate bends which may be curves.

The implement operates as a horse hay-fork in the usual manner. As a manure-rake or fork the operation is also usual, except during the act of unloading and thereafter.

The catch I being tripped by pressure on the pedal i, and the tine-head thereby released, the continued forward movement of the implement tends to upset the tines and deposit the load, tending, also, to throw the weight of the implement on the operator. On this movement commencing, the rear end of the runner M comes in contact with the ground, and as it is brought down on the ground the tines are elevated and completely disengaged from the load. It then supports the frame and enables the implement to be drawn over the ground inactive.

I wish to be understood as making no claim herein which can be held to cover or include any part of the invention for which Letters Patent were issued to me February 15, 1870.

I claim as my invention—

1. The adjustable latch H, as and for the purpose set forth.

2. The removable runner or support M, applied to the tine-head by the described means, for the purposes specified.

FRIEDRICH VILLARD.

Witnesses:
 JOHN J. ADAMS,
 FREDRICK VILLARD, Junior.